Oct. 5, 1943.                L. I. FRANK                2,331,269
                      CLOSURE ASSEMBLING MACHINE
                  Filed June 7, 1941         2 Sheets-Sheet 1
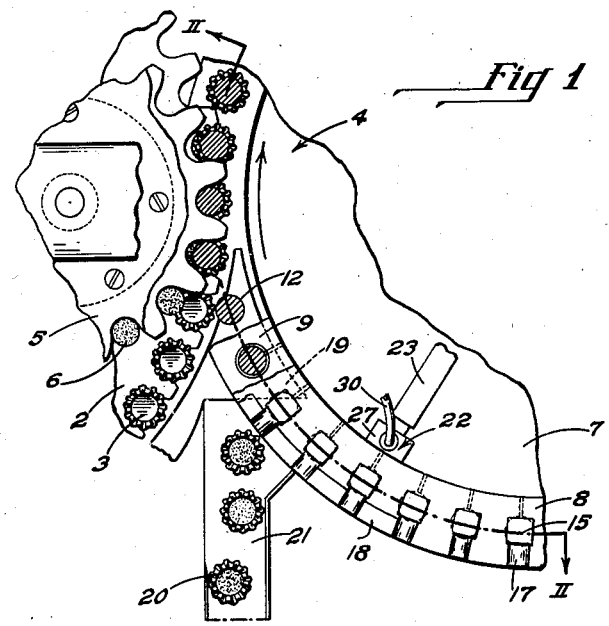
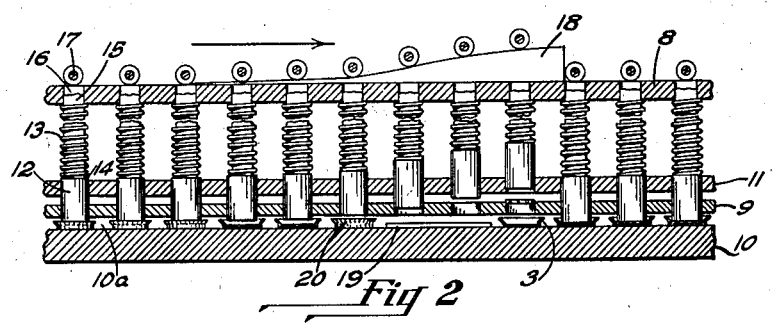

Oct. 5, 1943.　　　　L. I. FRANK　　　　2,331,269
CLOSURE ASSEMBLING MACHINE
Filed June 7, 1941　　　2 Sheets-Sheet 2
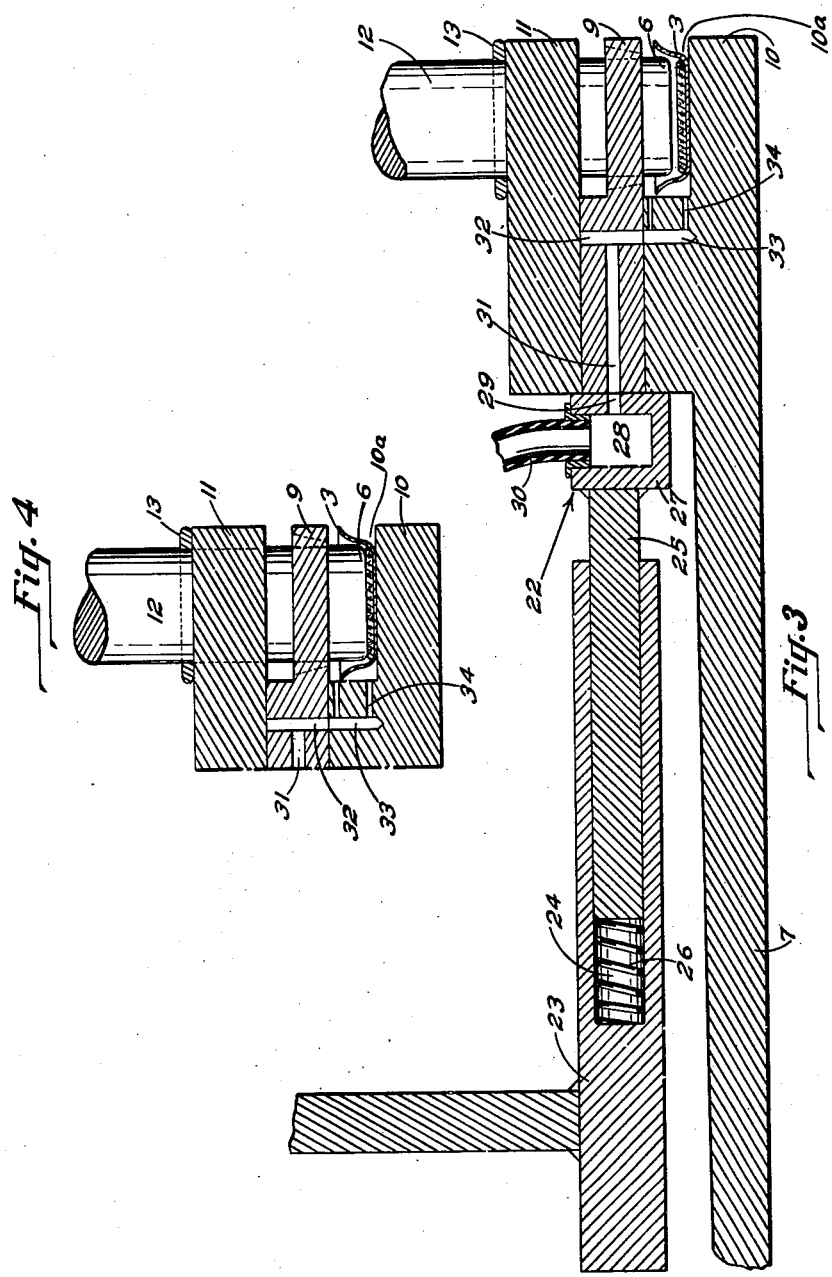

Patented Oct. 5, 1943

2,331,269

UNITED STATES PATENT OFFICE 2,331,269

CLOSURE ASSEMBLING MACHINE

Lewis I. Frank, Lancaster, Pa., assignor to Armstrong Cork Company, Lancaster, Pa., a corporation of Pennsylvania Application June 7, 1941, Serial No. 396,980

6 Claims. (Cl. 113—80)

This invention relates to closure assembling machines and, more particularly, to closure assembling machines including means for separating liners not disposed in closures from closures carrying liners.

Closure assembling machines are well known in the art and are disclosed, for example, in Nagy Patents Nos. 1,931,294 and 2,069,897, granted October 17, 1933 and February 9, 1937, respectively. It will be understood reference to such patents is by way of illustration only and is not to be construed in any way as limiting the application of my invention to similar or other types of closure assembling machines. Such machines generally comprise an assembling unit and suitable means to feed liners and closure shells separately to such unit. Adhesive means are provided to dispose adhesive in each shell. Plungers are generally provided in the assembling unit to force a liner in an aligned shell and to hold the liner in engagement therewith until the adhesive has set to a sufficient degree to bond the liner to the shell. The plungers are then raised and the closures are removed from the assembling unit.

Such devices are adapted for rapid economical production of closures but are subject to serious disadvantages. Frequently, a liner is fed to the assembling unit when a shell is not in position to receive it and such liners are subjected to the same operations as closures carrying liners and are removed from the assembling unit with such closures. Due to the extremely high rate of production which permits only scant inspection, many of such loose liners are packaged with the closures. This, of course, is disadvantageous. The user may believe the liner has fallen from a closure and hence questions the efficacy of the bond between the closure and liner or may spend considerable time in attempting to discover the closure without a liner which, of course, could not seal. The chief disadvantage resides in the fact that such liner during transportation and handling may wedge in a closure over a liner bonded therein; the capping mechanisms are adjusted to closures carrying only a single liner and this excess thickness may require the application of so great capping pressure that the container may be broken or crushed.

The chief object of my invention is to provide an improved closure assembling apparatus in which the disadvantages discussed above are eliminated. An object of my invention is to provide a closure assembling device which positively prevents loose liners being commingled with the closures and ensures separation of loose liners and closures. A further object is to provide means in combination with the plungers of assembling machines which serve to remove loose or unsecured liners while the plungers retain closures carrying liners in predetermined position. A still further object is to provide a jet through which a stream of compressed fluid may flow to eject loose liners while securely retaining closures carrying liners in the assembling unit.

This invention relates to closure assembling machines in which a plurality of star wheels are adapted to feed liners and closure shells to an assembling unit which includes a rotatable drum or wheel and a plurality of plungers adapted to dispose liners in shells and to hold them in engagement therewith until the adhesive has set to a sufficient degree to bond the liner to the closure. An air jet is disposed at a predetermined point about the periphery of the drum and means are provided to raise the plungers to release loose liners while retaining closures carrying liners in predetermined position. Thus as the wheel rotates, loose liners are released at or immediately before the air jet and as they pass before the jet are blown from the wheel into any suitable receptacle thus separating closures carrying liners and loose liners. The closures are then released, removed from the assembling unit and are packaged.

This invention further relates to a method of assembling liners and closures in which the liners are held in closures by means of movable plungers, in which the steps comprise moving the plungers sufficiently to release loose liners but insufficiently to release closures carrying liners and injecting fluid to remove the loose liners.

The attached drawings illustrate a preferred embodiment of my invention, in which Figure 1 is a fragmentary view, partly in plan and partly in section, illustrating assembling mechanism for inserting liners into the closure shells and means for removing assembled closures from the machine;

Figure 2 is a fragmentary sectional view of the pressure plungers and the lifting cam, the section being taken on the line II—II of Figure 1;

Figure 3 is a sectional view illustrating the liner ejecting mechanism in conjunction with the assembling unit;

Figure 4 is a fragmentary sectional view illustrating the pressure plunger in lowered position retaining the closure in position on the drum.

Referring to the drawings, there is illustrated in Figure 1 a star wheel 2 for feeding closure shells 3 to an assembling unit designated generally at 4 and a second star wheel 5 for feeding liners 6 to the unit 4 in alignment with the shells 3. Hoppers (not shown) are provided for the reception of the shells 3 and liners 6 and suitable mechanism is provided to feed the liners and shells to the star wheels and dispose them in pockets thereon. Means are, of course, provided to actuate the star wheels 2 and 5 and the assembling unit 4.

The assembling unit 4 (Figures 1 and 2) comprises a rotatable drum or wheel 7 having disposed about its periphery an upper ring 8, a lower ring 9, a base 10 and an intermediate partition 11. The base 10 is provided with an annular recess 10a for the reception of shells 3. A plurality of vertically movable plungers 12 are disposed at intervals about the drum 7 and extend through the rings 8 and 9, and the partition 11. A helical spring 13 surrounds each plunger 12 and is held, preferably, between a shoulder 14 on the plunger 12 and the upper ring 8. The plungers 12 are normally held in downward position. The upper ends 15 of the plungers 12 are square and extend through square openings 16 in the ring 8. Rollers 17 are mounted on the upper ends of the plungers 12 for a purpose hereinafter described. At a suitable point about the periphery of the drum 7 is mounted a cam 18 adapted to raise the plungers 12 by the rollers 17 riding thereover as shown in Figure 2. The cam 18 is so contoured as to raise the plungers 12 a distance sufficient to release loose liners but insufficiently to release closures carrying liners and then to raise the plungers 12 to an extent sufficient to release the closures carrying liners. A guide 19 is provided to remove the assembled closures 20 from the assembling unit 4 and lead them to a chute 21 down which they slide or are urged to a conveyor (not shown) which carries them to a suitable place for packaging or further fabricating.

At that point on the periphery of the drum 7 where the plungers 12 are raised to release loose liners, is disposed the liner ejecting mechanism designated generally at 22. Mechanism 22 comprises a support 23 mounted on the framework of the device and having an opening 24 therein adapted to receive a slide 25. Disposed within the opening 24 is a helical spring 26 adapted to urge the slide 25 outwardly. On an end of the slide 25 is mounted a member 27 having a chamber 28 therein and an opening 29 extending from the chamber 28 to an exterior surface of the member 27. The chamber 28 is connected to a suitable source of fluid under pressure, for example, compressed air, by a hose 30 threadedly connected to the member 27 by a bushing.

Returning now to the assembling unit 4, it will be noted by reference to Figures 3 and 4 that a horizontal conduit 31 is provided in the intermediate partition 9 extending inwardly from the rear surface thereof. A second vertically extending conduit 32 is provided in the partition 9 connected to the conduit 31 and aligned with a similar conduit 33 provided in the base 10. A plurality of horizontally extending conduits 34 are also provided in the base 10 and serve to connect the conduit 33 with the recess 10a in the base 10 in which the plungers 12 hold the loose liners and closures carrying liners. It will be understood similar conduits are provided around the periphery of the drum 7 adjacent each plunger 12. The slide 25 is yieldingly urged outward against the surface of the partition 9 in such manner that, as the drum 7 rotates, each conduit 31 is disposed momentarily in alignment with the opening 29 in the member 27 so that a blast of air injected into the conduit 31 flows into the conduits 32 and 33, and is expelled through the conduits 34 into the recess 10a in the base 10. Since the plungers 12 at such point are raised sufficiently to release liners not disposed in shells as shown in Figure 3, such air blast serves to eject loose liners from the device into any suitable receptacle but does not remove closures carrying liners for such closures are held in position by the plungers 12. Figure 4 shows the plungers 12 in lowered position to retain loose liners and closures carrying liners in the recess in the base 10.

To aid in a full understanding of my invention, I will describe the operation of the device. Shells 3 and liners 6 are fed from hoppers (not shown) to star wheels 2 and 5 which carry the shells 3 and liners 6 to the assembling unit 4 and dispose them in alignment thereon as shown in Figure 2. It will be understood suitable adhesive applying mechanism may be disposed at any suitable place along the periphery of star wheel 2 to place adhesive in the shells 3. The plungers 12 of the assembling unit 4 are normally held in downward position by the springs 13 but are adapted to be raised by the cam 18. The shells 3 and liners 6 are disposed in alignment on the drum 7 of the assembling unit 4 along the periphery of the drum 7 while the plungers 12 are in raised position. Again referring to Figure 2, it will be noted the liners 6 are disposed in the partition 9 immediately above openings therein while the shells 3 are disposed in the recess 10a in the base 10 in alignment therewith. Thus, as each plunger 12 passes cam 18, its spring 13 urges it downwardly forcing each liner 6 through the opening in the partition 9 and into a shell 6. The plungers 12 hold liners 6 in engagement with shells 3 as shown in Figure 4 until the adhesive therein has set to a sufficient degree to bond the liner to the shell. Occasionally, liners 6 are forced downwardly into the recess 10a and held therein by plungers 12 when shells 3 have not been disposed to receive them. The term "loose liners or disks" is used herein to denote such "skippers" or liners not disposed in shells.

As the drum 7 rotates, the plungers 12 hold the shells carrying disks and disks not placed in shells in the recess 10a in the base 10 and such objects are moved forward in the direction of the arrow (see Figure 1) to a position adjacent the cam 18. As the plungers approach this position, the rollers 17 ride on the cam 18 and are moved upwardly, raising the plungers 12 sufficiently to release liners not disposed in shells but insufficiently to release shells carrying liners as shown in Figure 3. Such upward movement of the plungers 12 compresses springs 13 to some extent. The jet 22 is disposed at this point about the periphery of the drum 7 and, preferably, continuously emits fluid under pressure, such as compressed air.

As pointed out previously, the conduits 31, as the drum 7 rotates, are disposed momentarily in alignment with the opening 29 of the jet 22. Thus, substantially simultaneously with the release of loose liners by the plungers 12, a blast of air penetrates the recess 10a and ejects or removes the loose liners therefrom into any suitable receptacle. It will be understood, of course, the plungers 12 retain the shells carrying liners in the recess 10a and thus the loose liners are separated therefrom expeditiously and without difficulty.

Upon further rotation of the drum 7, the plungers 12 are raised to a sufficient extent to release the shells carrying liners and the completed closures 20 are guided by the guide 19 from the assembling unit 4 to a chute 21 down which they slide to a conveyor (not shown) which carries them for packaging. As the plungers reach the high point of the cam 18, they abruptly leave the cam and are urged downwardly by the springs 13 forcing liners 6 into shells 3 and the process is repeated. It will be understood the process is continuous since similar plungers 12 are disposed at spaced intervals about the periphery of the drum 7.

My invention provides a mechanism and method which positively ensures separation of loose liners and closures in closure assemblying machines. The mechanism is simple, economical, and efficient, and may be easily applied or combined with existing equipment. It prevents commingling of loose liners or disks with completed closures in packages for shipment and thus obviates various disadvantages involved in capping containers. In addition, a considerable saving is effected by the recovery of loose liners or disks and their subsequent use with shells.

While I have described a preferred embodiment of my invention, it will be understood my invention is not limited thereto since it may be otherwise embodied within the scope of the following claims.

I claim:

1. In closure assembling apparatus including plungers for holding liners in engagement with closures, the combination of means for raising said plungers to release liners not disposed in closures while maintaining closures carrying liners in predetermined position, and means for ejecting released liners from the device in a substantially horizontal direction.

2. In closure assembling apparatus, the combination of means to dispose liners and closures in alignment on a rotatable wheel, a plurality of movable plungers disposed on said wheel adapted to dispose the liners in the closures and to hold them in engagement therewith, means for moving said plungers to release liners not disposed in closures while maintaining closures carrying liners in predetermined position, and means to eject liners not disposed in closures from the wheel while the closures carrying liners are held in position thereon by said plungers.

3. In closure assembling apparatus, the combination of means to dispose liners and closures in alignment on a rotatable wheel, a plurality of movable plungers disposed on said wheel adapted to dispose the liners in the closures and to hold them in engagement therewith, means for raising said plungers a distance sufficient to release liners not disposed in closures but insufficient to release closures carrying liners, and a jet through which a stream of compressed fluid may be urged to eject liners not disposed in closures from the wheel.

4. In closure assembling apparatus, the combination of star wheels adapted to dispose liners and closures in alignment on a rotatable wheel, a plurality of vertically movable plungers mounted on said wheel adapted to dispose the liners in the closures and to hold them in engagement therewith, a cam adapted to raise said plungers a distance sufficient to release liners not disposed in closures but insufficient to release closures carrying liners, and a jet disposed at a predetermined point about the periphery of said wheel through which a stream of fluid is passed to eject liners not disposed in closures from the wheel.

5. In combination with closure assembling apparatus including a rotatable wheel having a recess therein adapted to receive closures, a plurality of conduits extending through a wall of the wheel to the recess, plungers for holding liners in engagement with closures, means for moving said plungers to release liners not disposed in closures while maintaining closures carrying liners in predetermined position, and a stationary jet disposed adjacent said wheel in momentary alignment with each conduit as the wheel rotates adapted to inject fluid in the recess through said conduits to remove from the wheel liners not disposed in closures.

6. In a closure assembly apparatus, a closure support, a plunger to apply pressure to an assembled closure shell and liner disk positioned on said support, means for moving said plunger away from said support to permit removal of an unassembled liner disk disposed on said support but insufficient to permit removal of an assembled closure shell and liner, and means for ejecting in a substantially horizontal direction an unassembled liner from said support when said plunger is moved.

LEWIS I. FRANK.